US012781911B2

(12) United States Patent
Kokovidis

(10) Patent No.: US 12,781,911 B2
(45) Date of Patent: Nov. 3, 2026

(54) MODULAR MONITOR MOUNT

(71) Applicant: Drägerwerk AG & Co. KGaA, Lübeck (DE)

(72) Inventor: Christopher Kokovidis, Waltham, MA (US)

(73) Assignee: Drägerwerk AG & Co. KGaA, Lübeck (DE)

( * ) Notice: Subject to any disclaimer, the term of this patent is extended or adjusted under 35 U.S.C. 154(b) by 166 days.

(21) Appl. No.: 18/368,275

(22) Filed: Sep. 14, 2023

(65) Prior Publication Data

US 2024/0125422 A1 Apr. 18, 2024

Related U.S. Application Data

(60) Provisional application No. 63/416,354, filed on Oct. 14, 2022.

(51) Int. Cl.
*F16M 11/28* (2006.01)
*F16M 11/04* (2006.01)

(52) U.S. Cl.
CPC ..... *F16M 11/046* (2013.01); *F16M 2200/027* (2013.01)

(58) Field of Classification Search
CPC ..... A47B 21/02; A47B 9/10; A47B 2097/005; F16M 11/28
USPC ..... 248/162.1, 411
See application file for complete search history.

(56) References Cited

U.S. PATENT DOCUMENTS

| | | | | |
|---|---|---|---|---|
| 4,728,072 | A * | 3/1988 | Mitchell | A47C 3/24 248/406.1 |
| 6,644,748 | B2 * | 11/2003 | Tholkes | A47B 9/00 297/423.12 |
| 8,210,109 | B1 * | 7/2012 | Dewees | A47B 9/10 108/147 |
| 9,717,328 | B1 * | 8/2017 | Tsai | F16M 11/18 |
| 10,004,327 | B2 * | 6/2018 | McRorie, III | F16M 11/30 |
| 10,214,399 | B2 * | 2/2019 | Moore | B66F 3/36 |
| 10,610,010 | B2 * | 4/2020 | Matlin | F16M 11/2014 |
| 10,993,527 | B2 * | 5/2021 | Wiener | A47B 21/02 |
| 11,248,739 | B1 * | 2/2022 | Jordan | F16M 11/28 |
| 11,266,232 | B2 * | 3/2022 | Knapp | F16M 11/28 |
| 11,284,711 | B2 * | 3/2022 | Rossini | A47B 9/10 |
| 11,497,304 | B1 * | 11/2022 | Pan | A47B 9/10 |
| 11,540,623 | B2 * | 1/2023 | Hung | A47B 23/00 |
| 11,571,181 | B2 * | 2/2023 | Kim | F16C 31/04 |
| 11,647,831 | B2 * | 5/2023 | Pan | A47B 9/10 108/147 |
| 2004/0004165 | A1 * | 1/2004 | Hong | F16M 11/28 248/132 |
| 2007/0252919 | A1 * | 11/2007 | McGreevy | F16M 11/28 348/825 |

(Continued)

*Primary Examiner* — Bradley Duckworth
(74) *Attorney, Agent, or Firm* — Nolte Lackenbach Siegel

(57) ABSTRACT

In one aspect, a modular monitor mount comprises a base, a device mount, and an adjustable stand mechanically engaging the base. The stand includes a shaft on which the device mount is positioned and a height control mechanism. The height control mechanism further includes a pneumatic cylinder and a braking mechanism. The pneumatic cylinder is operable to offset a monitoring device weight and bias the position of the device mount to maintain a monitoring device at an adjusted height. The braking mechanism for fixing the position of the device mount at the adjusted height.

15 Claims, 11 Drawing Sheets

(56) References Cited

U.S. PATENT DOCUMENTS

| | | | | |
|---|---|---|---|---|
| 2013/0248670 | A1* | 9/2013 | Saez | F16M 13/022 248/295.11 |
| 2017/0020279 | A1* | 1/2017 | Ergun | A47B 9/10 |
| 2018/0168334 | A1* | 6/2018 | Swartz | F16M 11/046 |
| 2020/0240575 | A1* | 7/2020 | Lee | F16M 13/022 |
| 2021/0381638 | A1* | 12/2021 | Lai | F16M 11/041 |
| 2022/0079332 | A1* | 3/2022 | Köder | F15B 11/032 |
| 2023/0065758 | A1* | 3/2023 | Kwon | F16M 11/2014 |
| 2023/0228374 | A1* | 7/2023 | Kim | F16M 13/022 248/285.1 |

* cited by examiner

MODULAR MONITOR MOUNT

RELATED APPLICATIONS

The priority and earlier effective filing date of U.S. Application Ser. No. 63/416,354, filed Oct. 14, 2022, is hereby claimed for all purposes, including the right of priority, and is hereby incorporated by reference in full as if set forth herein verbatim.

TECHNICAL FIELD

The present disclosure pertains to medical device monitor mounts and, more particularly, to a modular monitor mount that allows, among other things, for improved height adjustment capabilities.

DESCRIPTION OF THE RELATED ART

This section introduces information from the art that may be related to or provide context for some aspects of the technique described herein and/or claimed below. This information is background information facilitating a better understanding of that which is disclosed herein. This is a discussion of "related" art. That such art is related in no way implies that it is also "prior" art. The related art may or may not be prior art. The discussion is to be read in this light, and not as admissions of prior art.

Medical monitoring devices are frequently mounted on mounting stands. Such mounting stands may include a device mount, a stand, and a base. The device mount may include one or more mechanical interfaces by which one or more monitoring devices may be mechanically engaged, or "mounted" to the stand. The device mount furthermore may be positioned at or near the top of a stand. The stand may be vertically adjustable to accommodate different heights for the mounted monitoring device. The base generally provides stability for the mounting stand and monitoring device. In some instances, the base may rest upon the floor or ground and frequently will include three or more feet, stops, or castors. Castors are typically employed to provide mobility to the stand so that the mounted monitoring device may be moved along the floor (e.g., horizontal mobility) as desired. This horizontal mobility may be controlled by providing brakes for the castors that may be released and engaged to permit the castors to roll or remain fixed in position. In other instances, the base may be, for example, a wall mount.

SUMMARY

In one aspect, a modular monitor mount comprises a base, a device mount, and an adjustable stand mechanically engaging the base. The stand includes a shaft on which the device mount is positioned and a height control mechanism. The height control mechanism further includes a pneumatic cylinder and a braking mechanism. The pneumatic cylinder is operable to offset a monitoring device weight and bias the position of the device mount to maintain a monitoring device at an adjusted height. The braking mechanism for fixing the position of the device mount at the adjusted height.

The above presents a simplified summary in order to provide a basic understanding of some aspects of the invention. This summary is not an exhaustive overview of the invention. It is not intended to identify key or critical elements of the disclosure or to delineate the scope of the invention. Its sole purpose is to present some concepts in a simplified form as a prelude to the more detailed description that is discussed later.

BRIEF DESCRIPTION OF THE DRAWINGS

The subject matter disclosed below may be understood by reference to the following description taken in conjunction with the accompanying drawings, in which like reference numerals identify like elements, and in which.

Figure 1:
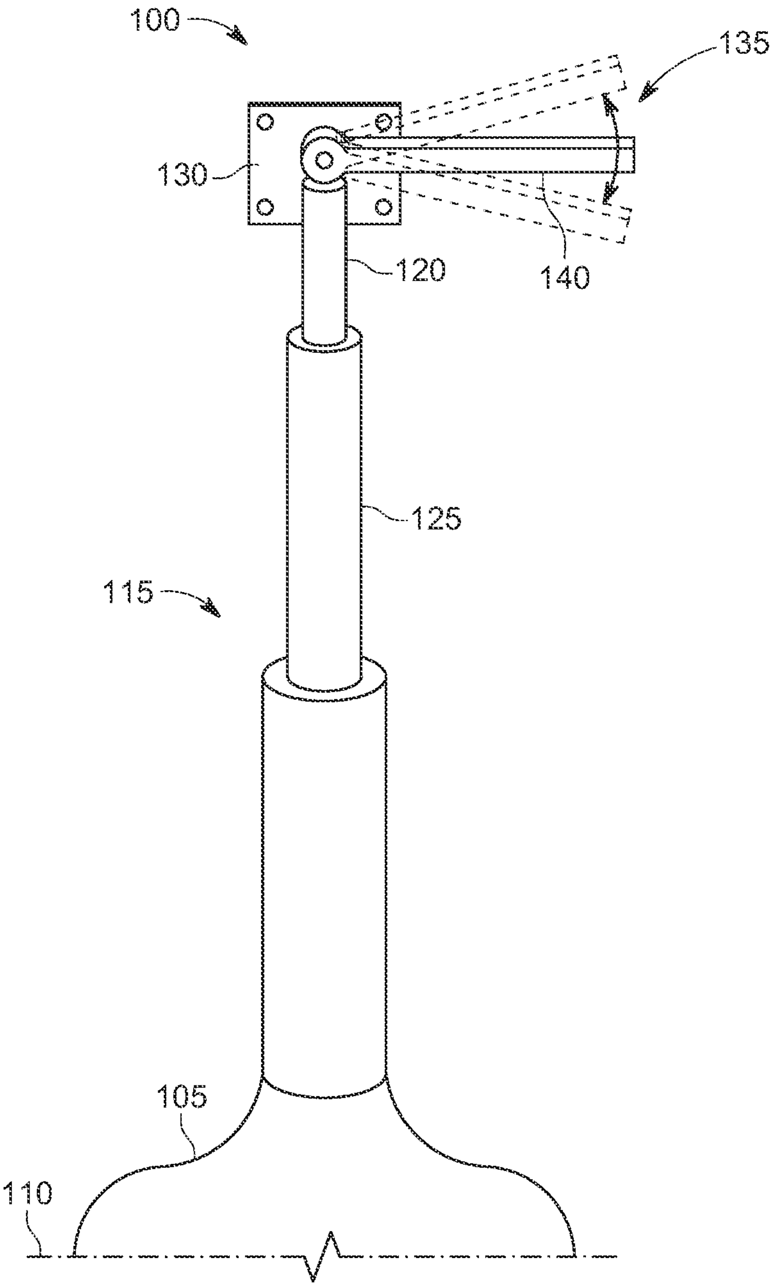
FIG. 1 depicts a modular monitor mount in which the base rests on the floor in accordance with one or more embodiments.

While the disclosed technique is susceptible to various modifications and alternative forms, the drawings illustrate specific embodiments herein described in detail by way of example. It should be understood, however, that the description herein of specific embodiments is not intended to limit that which is claimed to the particular forms disclosed, but on the contrary, the intention is to cover all modifications, equivalents, and alternatives falling within the spirit and scope of the appended claims.

DETAILED DESCRIPTION

The utility of monitor mounts such as are described above is accompanied by several difficulties. For example, a laden monitor mount can be heavy enough that more than one person may be used to move or manipulate the monitor mount. In some circumstances, it may even be advisable to have an information technology ("IT") technician adjust the device. In still other circumstances, the delivery of medical services may be time critical such that quick deployment and manipulation of the monitor mount is desirable. A medical care provider, for instance, might want to be able to quickly adjust the monitor mount with a single hand, leaving the other hand free to perform other tasks.

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In general, a modular monitor mount as disclosed herein comprises a base, a device mount, and an adjustable stand mechanically engaging the base. The stand may include a shaft on which the device mount is positioned and a height control mechanism. The height control mechanism may be used for vertical adjustment (relative to the ground or floor) of the modular monitor mount and its associated monitor. The height control mechanism may include a pneumatic cylinder and a braking mechanism. The pneumatic cylinder is operable to offset a monitoring device weight (and the weight of the modular monitor mount itself) and to bias the vertical position of the device mount to maintain a monitoring device at an adjusted height. The braking mechanism may be used for fixing the vertical position of the device mount at the adjusted height.

In some embodiments, the base may rest upon a surface of a floor or the ground. The shaft in these embodiments extends generally upward, or vertically, from the base and may be in a single piece or in one or more pieces. Note that the terms “generally upward” and “generally vertical” do not require that the shaft be entirely vertical. The shaft may, in some embodiments, include bends or angles to accommodate various design concerns. The shaft may also include pieces that are horizontal or parallel the ground in some embodiments.

The shaft may be a one-part shaft, a two-part shaft, a three-part shaft, a four-part shaft, or include more than five parts. If the shaft comprises a single piece—e.g., a one-part shaft—then the pneumatic cylinder may be interposed between the shaft and the base or between the device mount and the shaft. If the shaft comprises two or more pieces—e.g., a two-part shaft—then the pneumatic cylinder may be interposed not only between the base and the shaft or between the device mount and the shaft, but also between parts of the shaft. The various parts of the shaft in a multi-part shaft may vertically telescope relative to one another.

In other embodiments, the base may be a wall mount. The shaft may still be either in one part or in two or more parts and, in these embodiments, at least a portion of the shaft may extend horizontally from the wall. The shaft may be jointed or scissored to permit articulation with two or three degrees of articulation. The base may include a vertically oriented track with a runner from which the shaft extends. The pneumatic cylinder may then be interposed within the track between the runner and the surface of the floor or ground.

Those in the art will appreciate that different monitoring devices may have differing weights. To accommodate this variation in monitoring device weights, the pneumatic cylinder may have a means for adjustment in some embodiments. For example, some embodiments may include one or more valves to bleed or increase gas content in the pneumatic cylinder. Other embodiments may include a mechanism to physically alter the operable volume of the pneumatic cylinder. Those in the art may appreciate still other means by which variation in monitoring device weights may be accommodated.

The braking mechanism may include a brake that admits wide variation in implementation. Various embodiments may include, without limitation, a lever that swivels or pivots between an engaged position and a released position or a handle that rotates between the engaged position and the released position. The braking mechanism may include a way to mechanically engage one or more parts of the shaft. In some embodiments, this mechanical engagement may be a clamping. Thus, in these embodiments, the braking mechanism may include a clamp that when engaged, clamps the shaft to prevent further movement and hold the device monitor at the adjusted height. Those in the art may appreciate still other implementations for the braking mechanism.

The device mount may also admit wide variation to accommodate the mounts on different monitoring devices. In some embodiments, the device mount may comport with the Video Electronics Standards Association (“VESA”) Interface Standard. Other embodiments might include a device mount that is a tray or shelf to which the monitoring device may be secured. Those in the art may appreciate still other implementations for the device mount.

The pneumatic cylinder includes a reciprocating piston and a pressurized cylinder of gas. The weight of the monitoring device mounted to the modular monitor mount is transferred through the device mount and the shaft to the piston. The pressure of the gas in the pressurized cylinder is set to offset the monitoring device weight and bias the position of the device mount to maintain a monitoring device at an adjusted height in a manner described below. The gas in the pressurized cylinder may be air gathered from the ambient atmosphere. However, the gas may be any suitable gas. In some embodiments, the lift force produced by the pressurized cylinder is consistent over the entire range of motion.

Turning now to the drawings, FIG. 1 depicts a modular monitor mount 100 in which the base 105 rests on the floor 110. The pneumatic cylinder 115 is interposed between the one-piece shaft 120 and base 105. More particularly, the one-piece shaft 120 is mounted atop the piston 125 of the pneumatic cylinder 115 as shown. The device mount 130 comports with the VESA standard. The braking mechanism 135, includes a lever 140 that swivels or pivots between an engaged position and a released position as indicated by the arrows.

Figure 2:
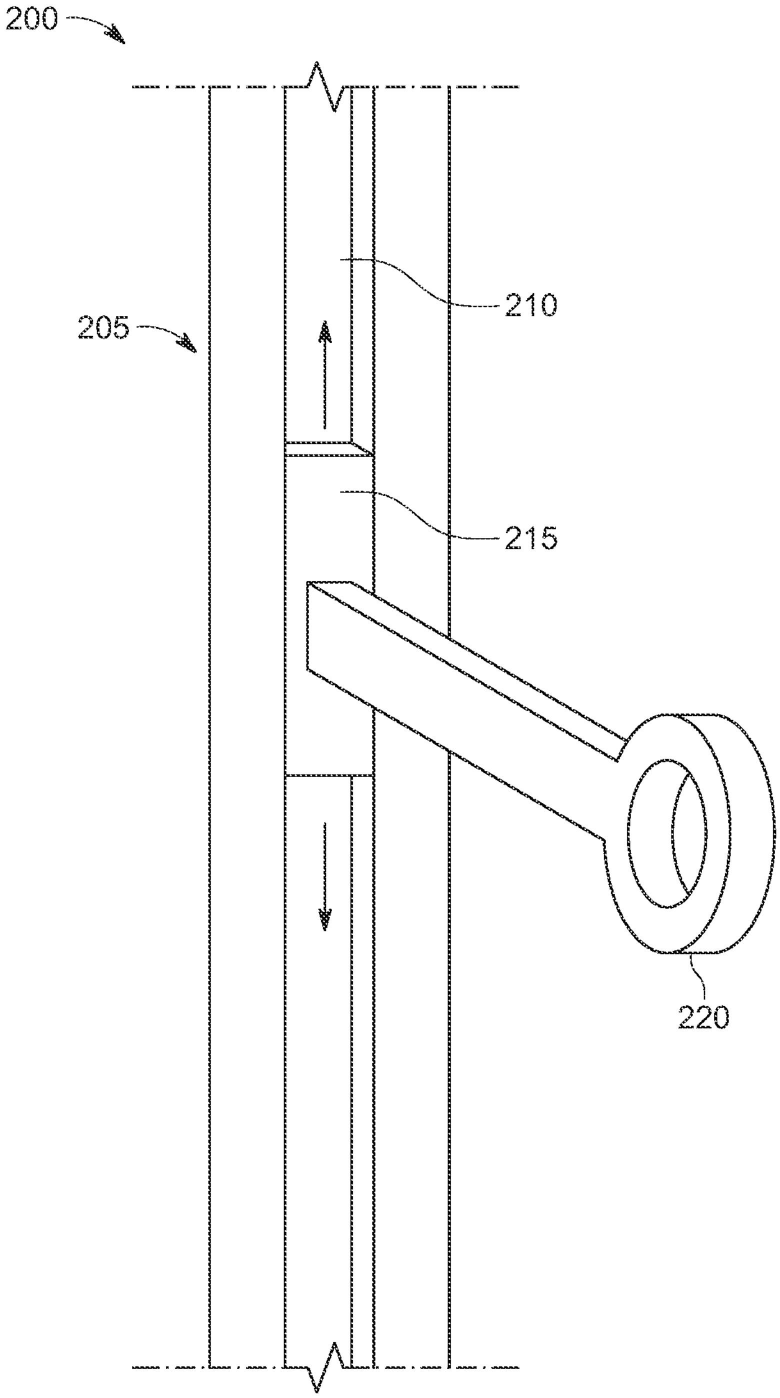
FIG. 2 depicts a modular monitor mount which the base is a wall mount in accordance with one or more embodiments.

FIG. 2 depicts a modular monitor mount 200 for which the base 205 is a wall mount. More particularly, the base 205 includes a vertically oriented track 210 including a runner 215 from which the shaft (not shown) extends. The runner 215 runs vertically up and down along the track 210 as indicated by the arrows. The braking mechanism includes a handle 220 that rotates between the engaged position and the released position. The shaft and the device mount are not shown in FIG. 2 for the sake of clarity.

Figure 3:
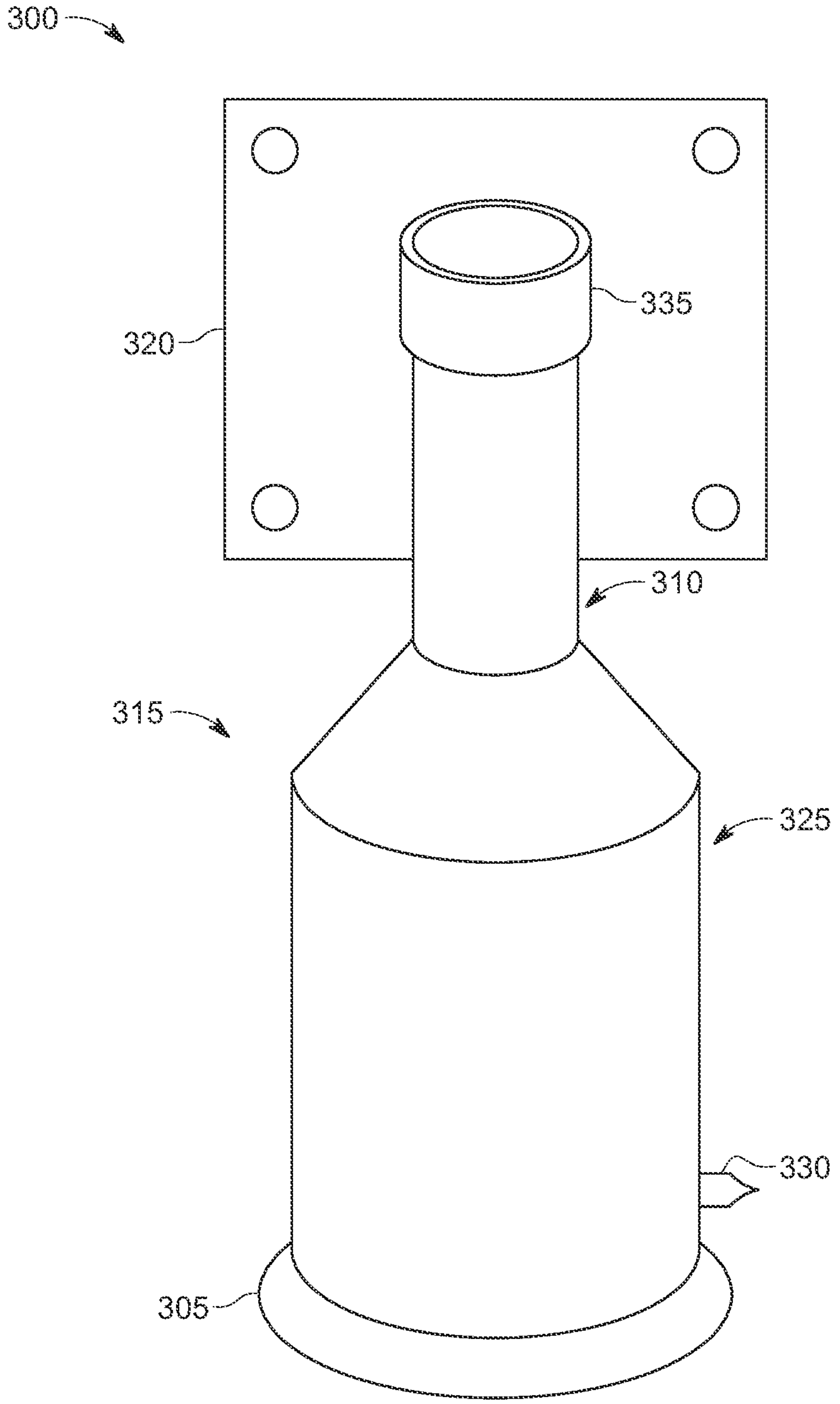
FIG. 3 and FIG. 4 illustrate a modular monitor mount including features permitting pressure control in accordance with one or more embodiments.
Figure 4:
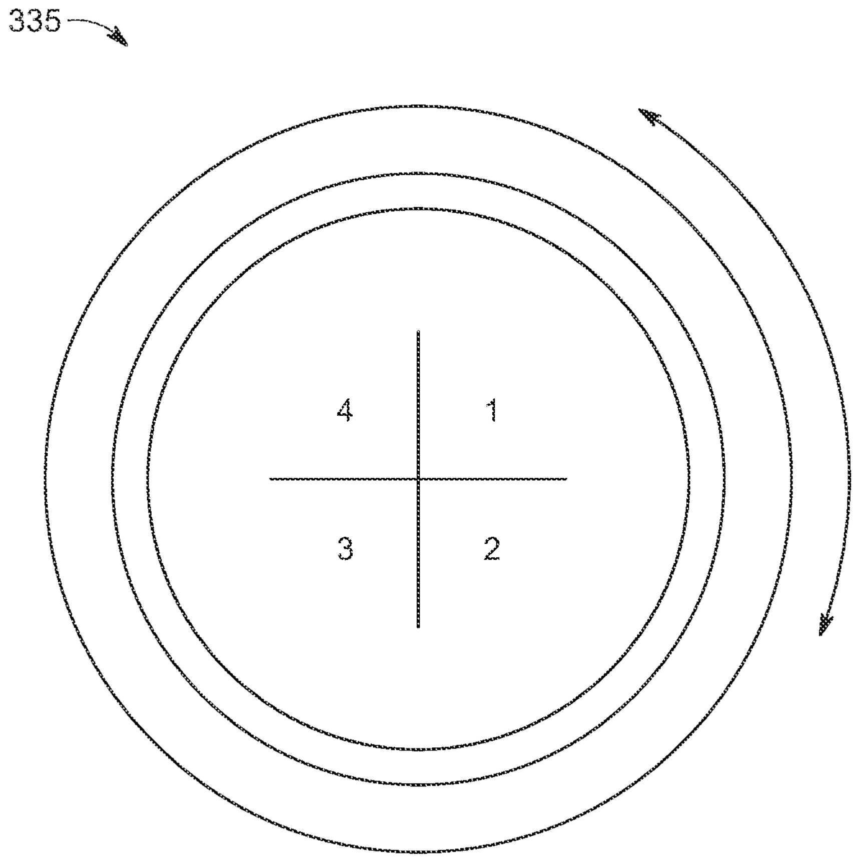

FIG. 3 and FIG. 4 illustrate a modular monitor mount 300. Again, the base 305 rests on the surface of the floor or ground (not indicated). The shaft is the piston 310 of the pneumatic cylinder 315 and the device mount 320 is another VESA adaptor. The pressurized cylinder 325 includes a valve 330 to bleed or increase gas content in the pressurized cylinder 325 of the pneumatic cylinder 315.

The modular monitor mount 300 also includes a rotational selector 335 on the piston 310. The rotational selector 335 controls the operational volume (i.e., the portion of the total volume of the pressurized cylinder 325 actually containing the gas) of the pressurized cylinder 325. The rotational selector 335 rotates bidirectionally in a horizontal plane normal to the vertical as indicated by the arrows in the top view of FIG. 4 to increase and decrease the operational volume of pressurized cylinder 325. The embodiment shown in FIG. 4 includes four settings for the rotational selector 335 but the number of settings is an implementation specific detail that may vary.

Figure 5:
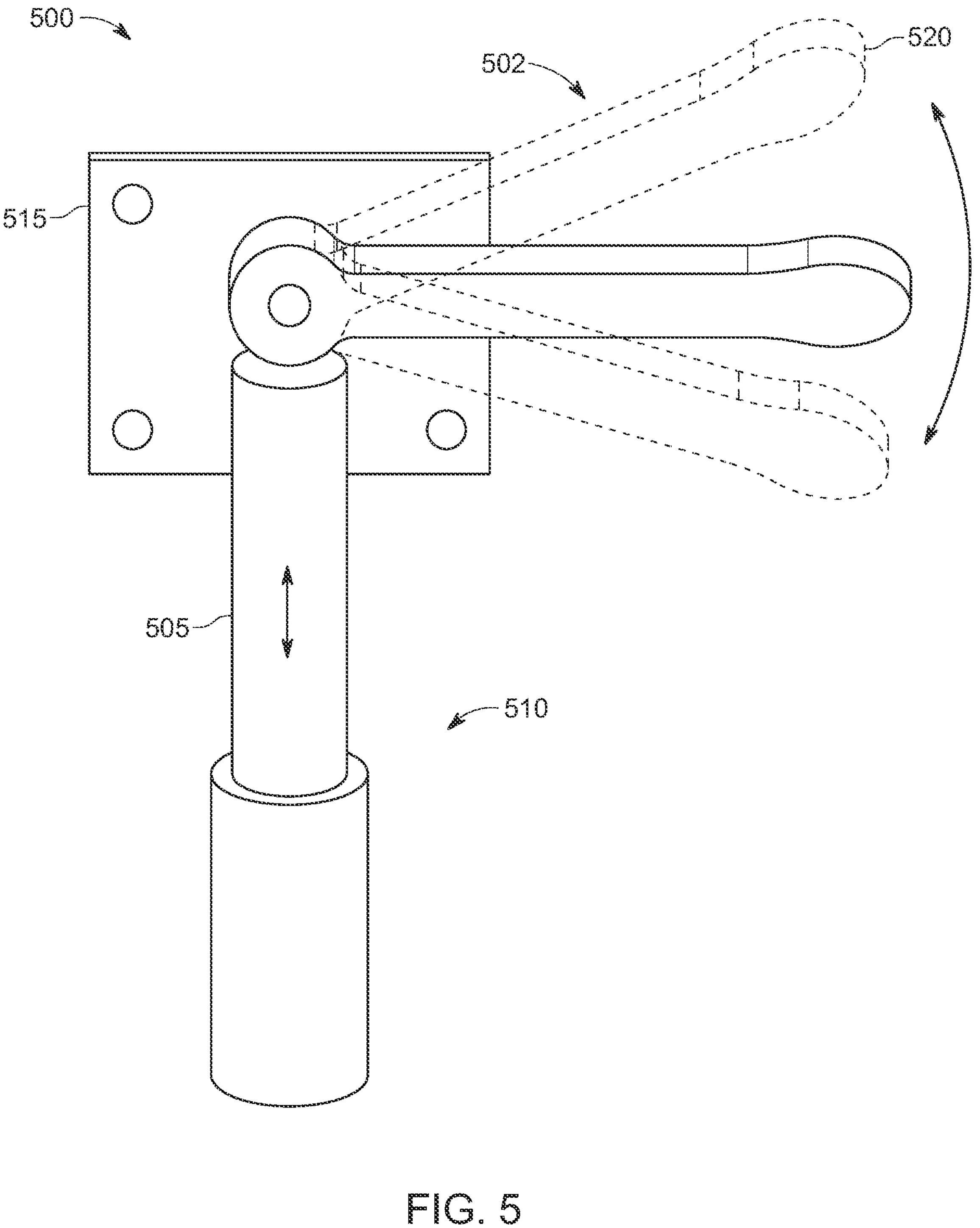
FIG. 5 and FIG. 6 illustrate respective modular monitor mounts employing differing braking mechanisms in accordance with one or more embodiments.
Figure 6:
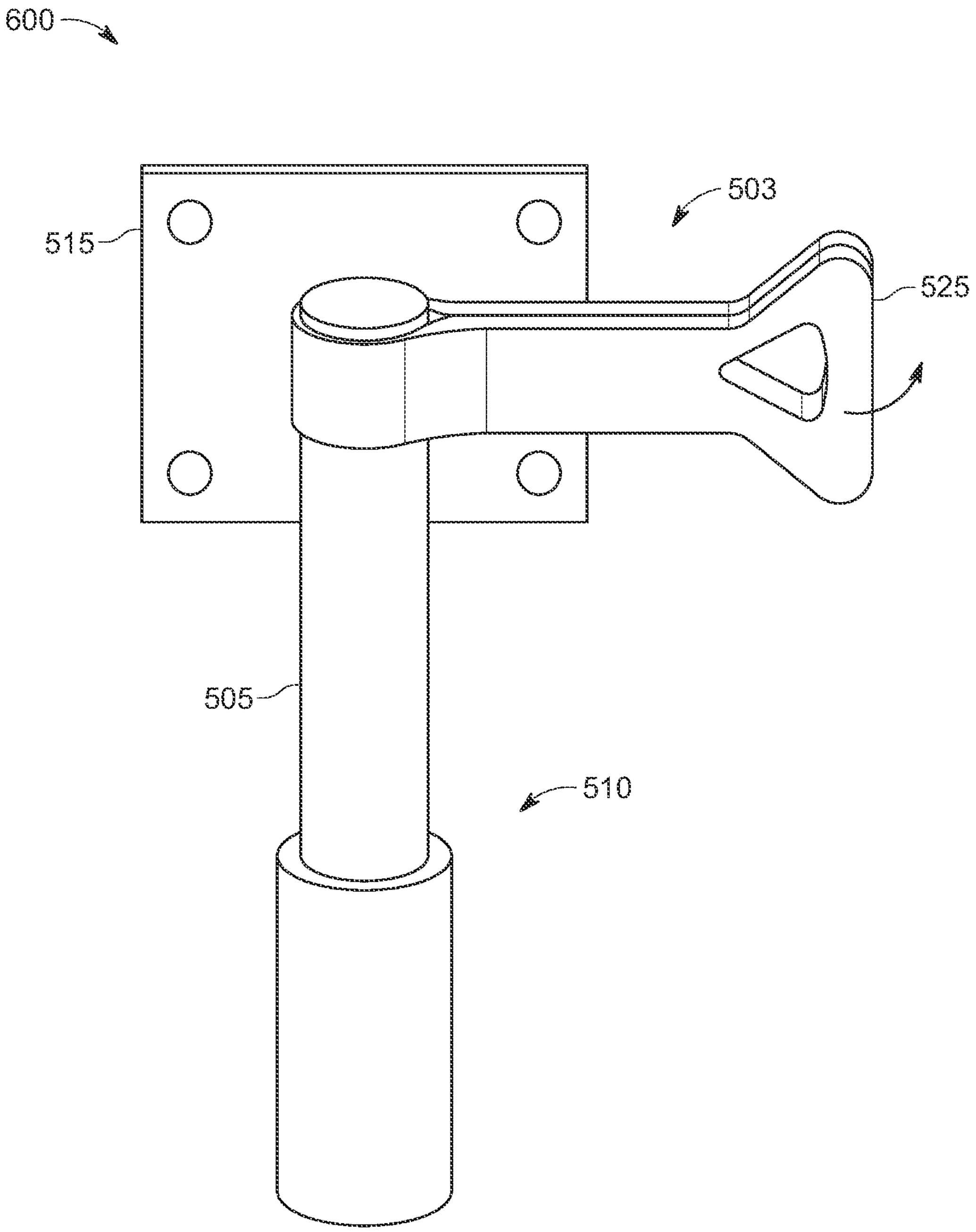

FIG. 5 and FIG. 6 illustrate a modular monitor mount 500 and a modular monitor mount 600, respectively. The modular monitor mounts 500, 600 employ two different implementations for the braking mechanism 502, 503, respectively. In some embodiments, a cam mechanism may be provided to engage/disengage the lock of braking mechanism 502, 503. In each modular monitor mount 500, 600, the reciprocating piston 505 of the pneumatic cylinder 510 functions as the shaft and the device mount 515 is a VESA mount. In the modular monitor mount 500, a lever 520 swivels or pivots between an engaged and a released position in a vertical plane as shown and as indicated by the arrows. In the modular monitor mount 600, a handle 525 is pulled and pushed in a horizontal plane between an engaged position and a released position as indicated by the arrow.

Figure 7:
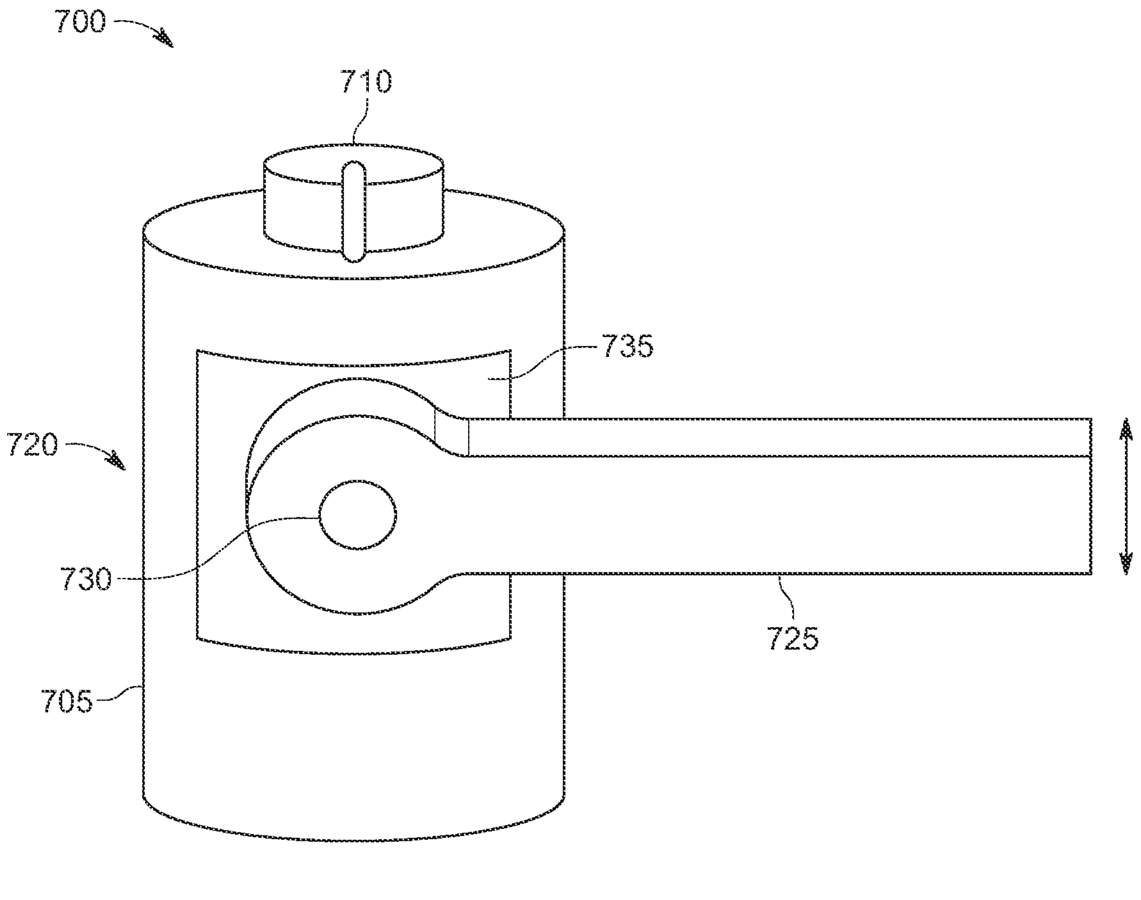
FIG. 7 and FIG. 8 depict a portion of another modular mount in a front and a side view, respectively, in accordance with one or more embodiments.
Figure 8:
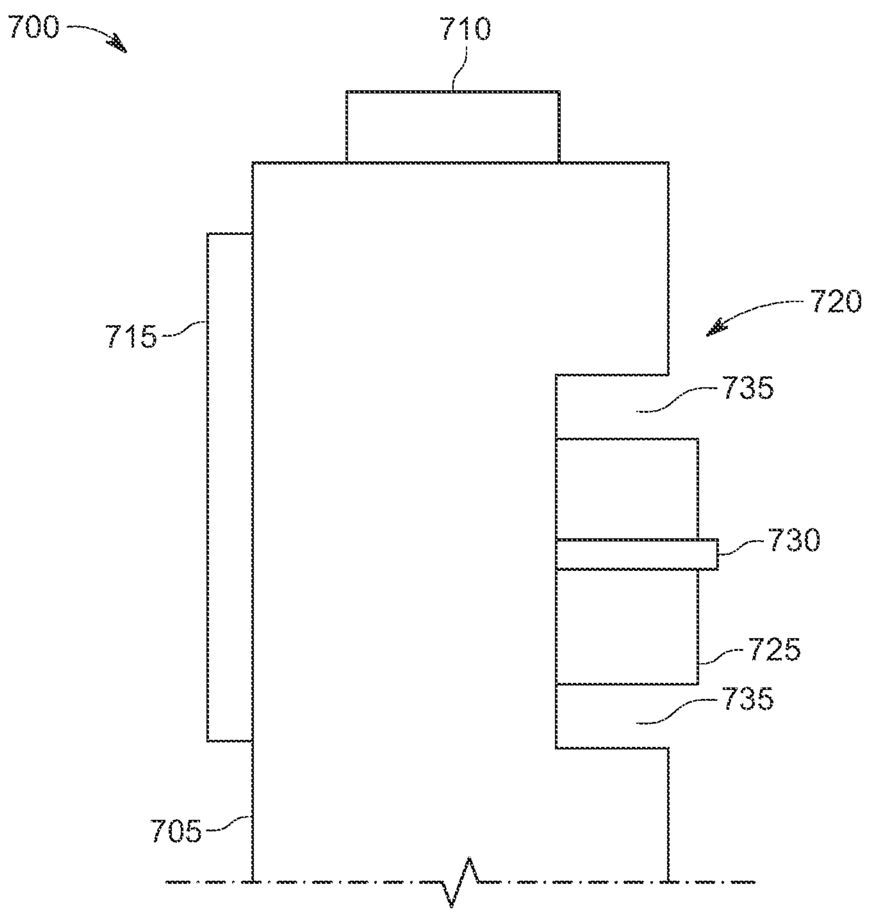

FIG. 7 and FIG. 8 depict a portion of a modular mount 700 in a front and a side view, respectively. The shaft 705 may be the reciprocating piston of a pneumatic cylinder not otherwise shown or a separate piece mounted to a reciprocating piston. A rotational selector 710 is located atop the shaft 705. A device mount 715, shown in FIG. 8, is located on one side of the shaft 705. The braking mechanism 720 including a lever 725 swivels about a point 730 and between an engaged position and a released position as indicated by the arrows in FIG. 7. The braking mechanism 720 includes a clamp that, when actuated, clamps one of the first part and the second part of the shaft to limit movement and hold the device monitor at the adjusted height. The lever 725 is mounted in a recess 735 in the shaft 705.

Figure 9:
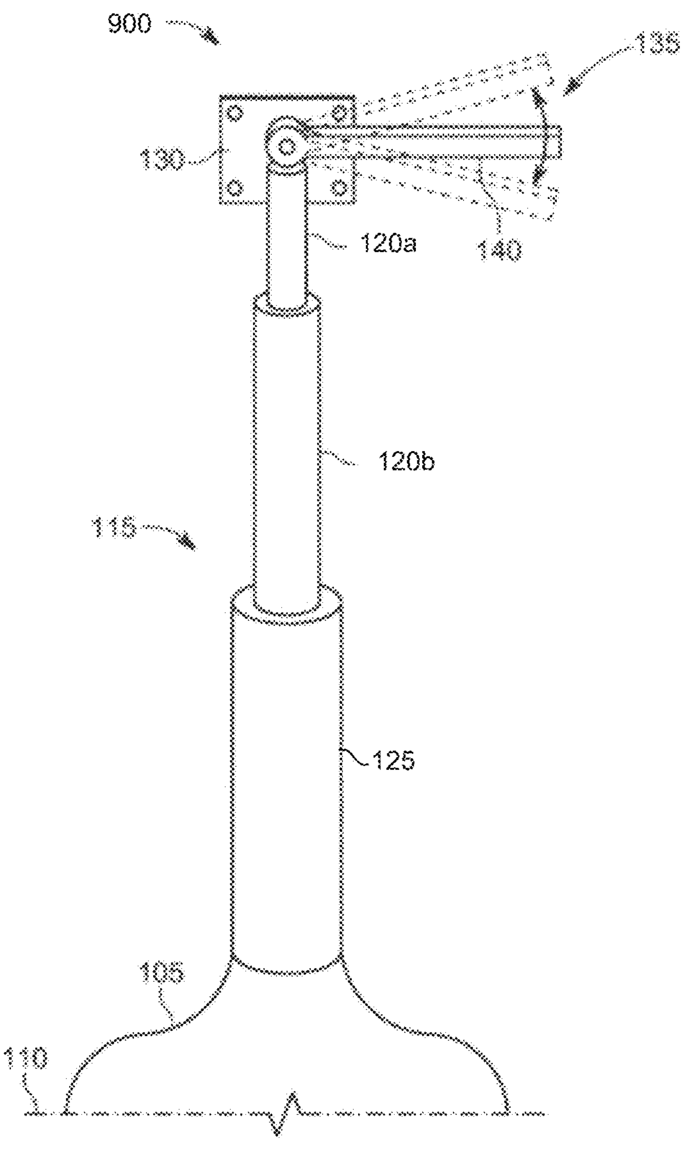
FIG. 9 depicts a modular mount in accordance with one embodiment having a two-part shaft, first part telescoping relative to a second part.

FIG. 9 depicts a modular mount 900 in accordance with one embodiment having a two-part shaft including first part 120*a* telescoping relative to a second part 120*b*.

Figure 10:
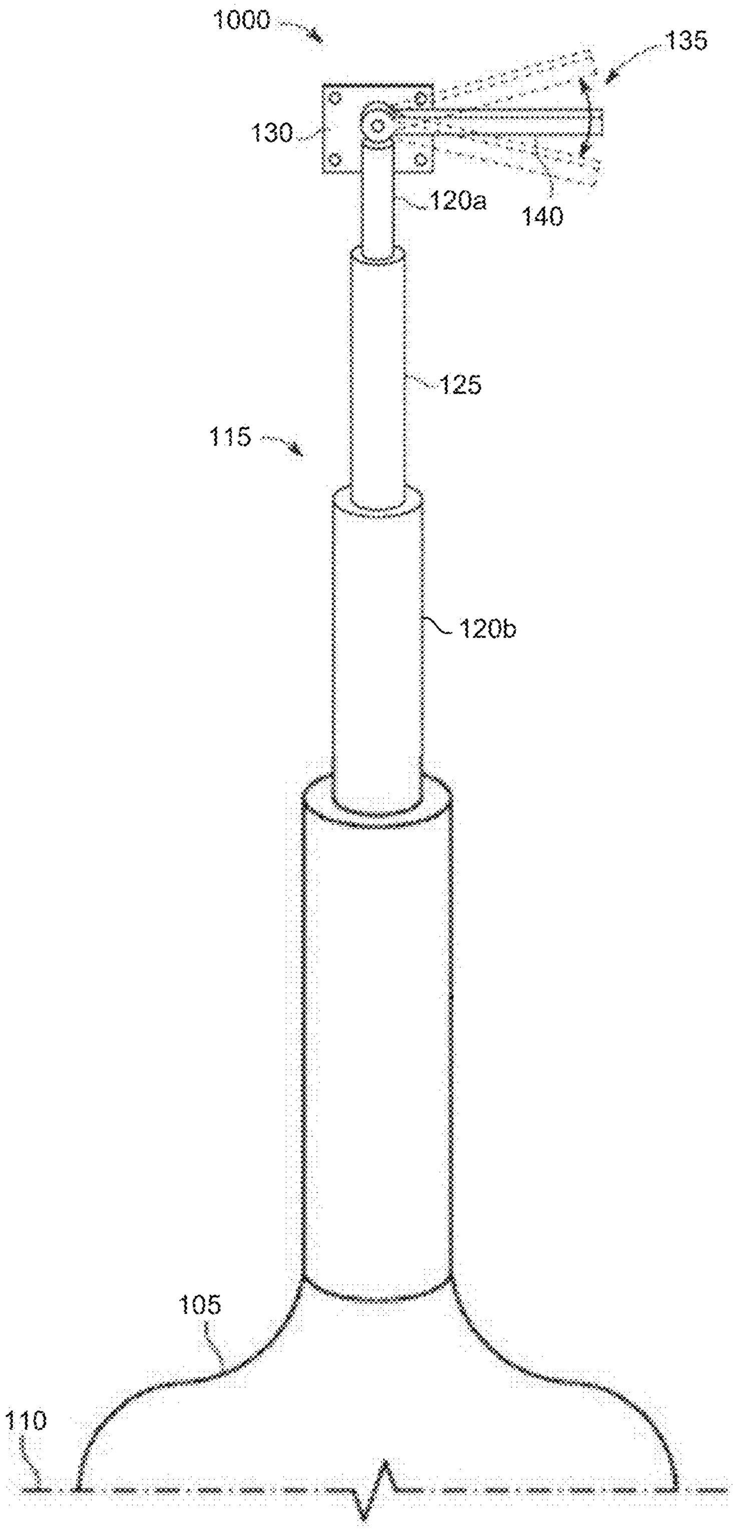
FIG. 10 depicts a modular mount in accordance with one embodiment having a two-part shaft including a first part and a second part with a pneumatic cylinder interposed between the first part and the second part.

FIG. 10 depicts a modular mount 1000 in accordance with one embodiment including a two-part shaft including a first part 120*a* and a second part 120*b* with a pneumatic cylinder 125 interposed between the first part 120*a* and the second part 120*b*.

Figure 11:
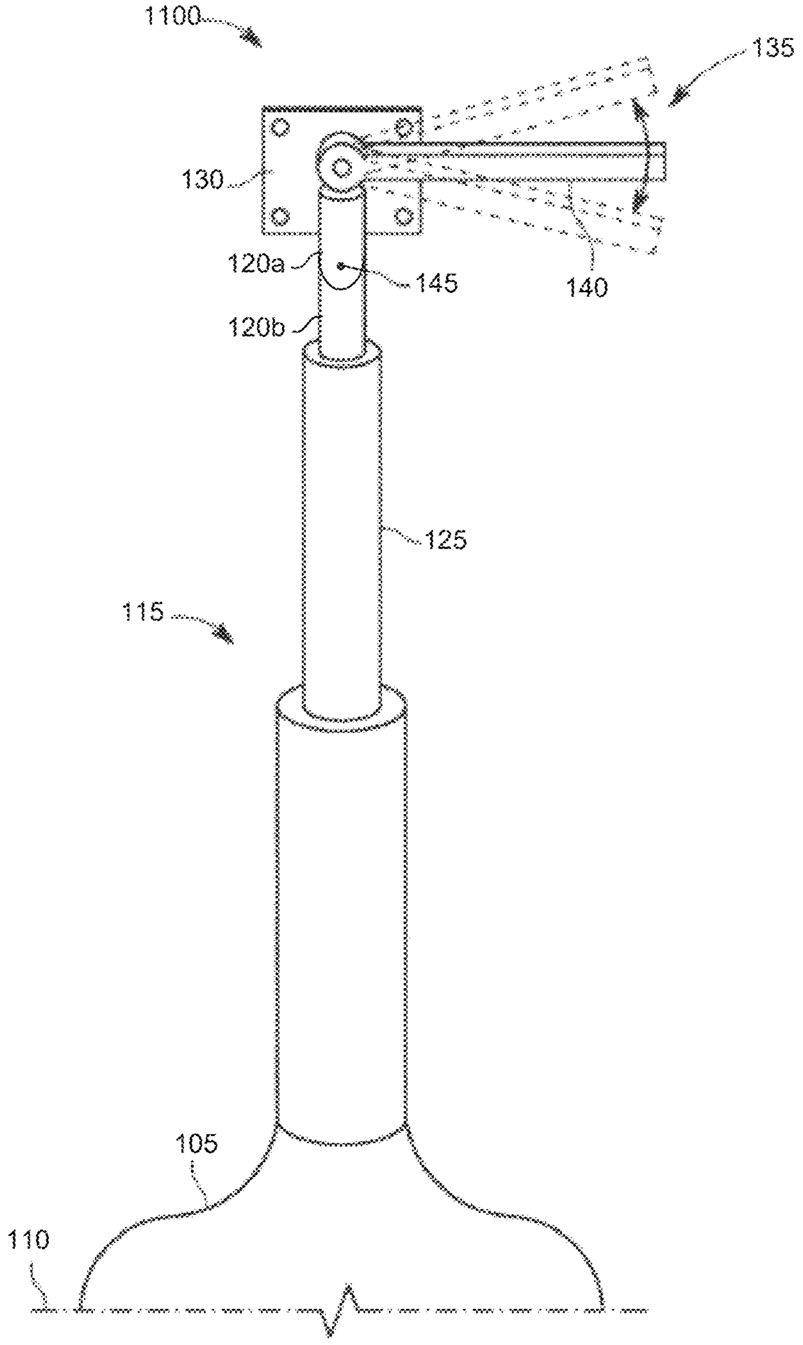
FIG. 11 depicts a modular mount in accordance with one embodiment having a two-part shaft including a first part and a second part, the first part and the second part being jointed for articulation of the shaft.

FIG. 11 depicts a modular mount 1100 in accordance with one embodiment including a two-part shaft including a first part 120*a* and a second part 120*b*, the first part 120*a* and the second part 120*b* being jointed for articulation of the shaft at an joint 145.

Modular monitor mounts manufactured and used in the manner described herein and claimed below will allow a user (e.g., a care provider, health care aide, or assistant) to adjust the height of the monitoring device mounted thereto comfortably, quickly, and easily. Adjustments may be made with relatively minimal effort. Such adjustments would no longer employ multiple people or an information technology ("IT") technician. The adjustment may also be made using a single hand, thereby leaving the other hand available for other tasks. Implementations of the pneumatic cylinder may be customized to accommodate varying weights of different monitoring devices. The braking mechanism will also lock the height of the monitoring device by default, thereby preventing a "free fall" of the monitoring device, should the adjusting hand slip off the braking mechanism.

Directional terms used herein such as "raise", "lower", "up", "down", "vertical", and "horizontal" and derivations of such directional terms are all defined relative to the force of gravity. So, for example, the terms "raise", "lower", "up", "down", and "vertical" describe a direction or action in a direction consonant with or parallel to the direction of the force vector for Earth's gravity which is normal to the plane defined by the ground, floor, or Earth's surface. Similarly, the term "horizontal" describe a direction or an action in a direction normal to the force vector of Earth's gravity and in a direction consonant with or parallel to the plane defined by the ground, floor, or Earth's surface.

This concludes the detailed description. The particular embodiments disclosed above are illustrative only, as the claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the claims. Accordingly, the protection sought herein is as set forth in the claims below.

What is claimed is:

1. A modular medical monitor mount, comprising:
a base;
a medical monitoring device mount; and
an adjustable stand mechanically engaging the base and the medical monitoring device mount, the stand including:
a one-piece shaft on which the medical monitoring device mount is positioned having a first end most proximal to the base and a second end most distal from the base; and
a height control mechanism, further including:
a pneumatic cylinder engagingly connected to the shaft at the first end and interposed between the first end of the shaft and the base and operable to offset a medical monitoring device weight and bias the position of the medical monitoring device mount to maintain a medical monitoring device at an adjusted height; and
a braking mechanism for fixing the position of the medical monitoring device mount at the adjusted height.

2. The modular medical monitor mount of claim 1, wherein the shaft extends upwardly in a vertical direction from the base.

3. The modular medical monitor mount of claim 1, wherein the braking mechanism locks the relative positions of a first part and a second part of the shaft by default.

4. The modular medical monitor mount of claim 1, wherein the braking mechanism includes a lever that swivels or pivots between an actuated position and a released position.

5. The modular medical monitor mount of claim 1, wherein the braking mechanism includes a handle that rotates between an actuated position and a released position.

6. The modular medical monitor mount of claim 1, wherein the braking mechanism includes a clamp that, when actuated, clamps one of a first part and a second part of the shaft to limit movement and hold the device monitor at the adjusted height.

7. The modular medical monitor mount of claim 1, wherein the medical monitoring device mount comports with the Video Electronics Standards Association ("VESA") Interface Standard.

8. The modular medical monitor mount of claim 1, wherein the pneumatic cylinder includes a pressure adjustment to accommodate different medical monitoring device weights.

9. The modular medical monitor mount of claim 8, wherein the pressure adjustment comprises one or more valves to bleed or increase gas content in the pneumatic cylinder.

10. A method for use of a modular medical monitor mount, comprising:

mounting a medical monitoring device to a medical monitoring device mount of the modular medical monitor mount wherein the medical monitoring device mount comprises a one-piece shaft engagingly affixed to a height control mechanism at a first end and connected to the medical monitoring device mount at a second end:

altering the height of the mounted medical monitoring device, the position of the mounted medical monitoring device being biased by offsetting the weight thereof; and fixing the height of the mounted medical monitoring device.

11. The method of claim 10, further comprising adjusting the pressure in a pneumatic cylinder to accommodate different medical monitoring device weights.

12. The method of claim 10, further comprising adjusting the position of the shaft to which the medical monitoring device mount is affixed.

13. A modular medical monitor mount, comprising:

a base;

a medical monitoring device mount;

a means for adjusting and fixing the height of the medical monitoring device mount mechanically engaging the base and the medical monitoring device mount, the adjusting and fixing including biasing the position of the medical monitoring device mount to maintain a medical monitoring device mounted to the medical monitoring device mount at an adjusted height; and a one-piece shaft having a first end and a second end, wherein the shaft is engagingly connected to the means for adjusting and fixing the height of the medical monitoring device mount at the first end and connected to the medical monitoring device mount at the second end.

14. The modular medical monitor mount of claim 13, wherein the means for adjusting and fixing comprises an adjustable stand.

15. The modular medical monitor mount of claim 14, wherein the adjustable stand further comprises:

a height control mechanism, further including:

a pneumatic cylinder operable to offset a medical monitoring device weight and bias the position of the medical monitoring device mount to maintain the medical monitoring device at an adjusted height; and a braking mechanism for fixing the position of the medical monitoring device mount at the adjusted height.

* * * * *